Patented Mar. 9, 1937

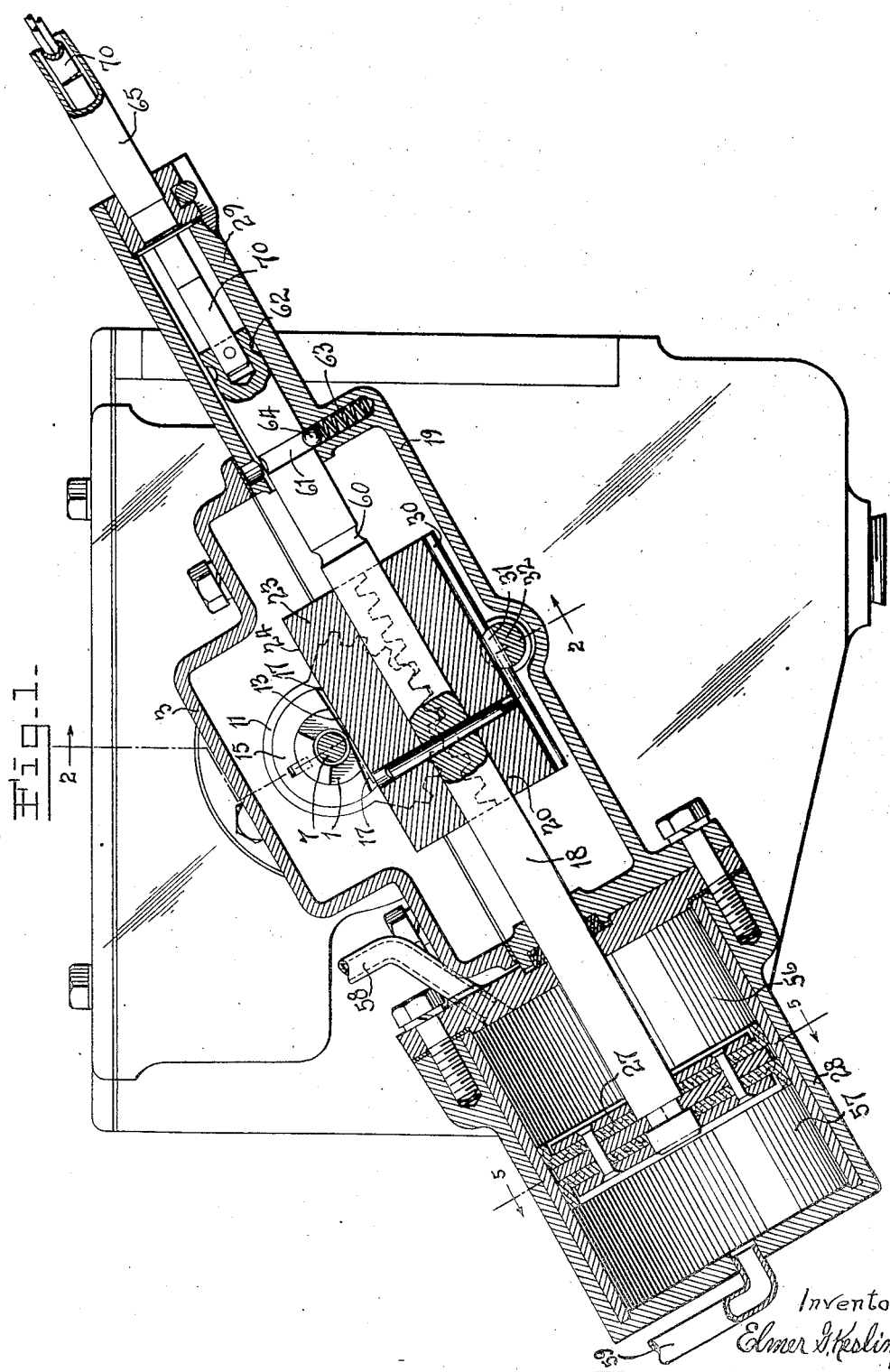

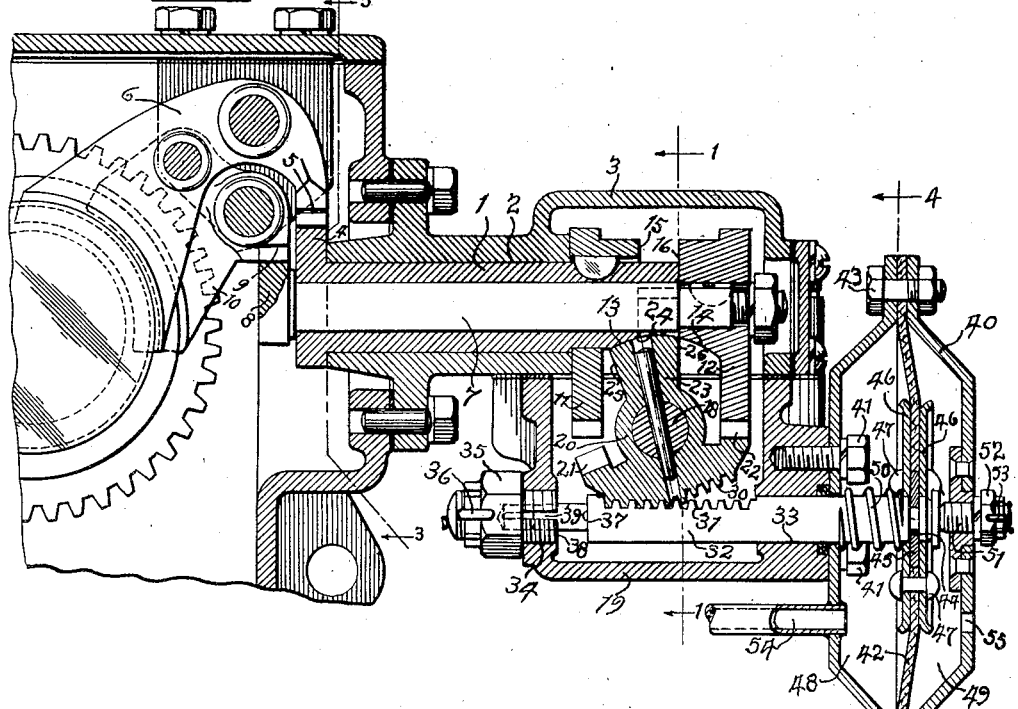
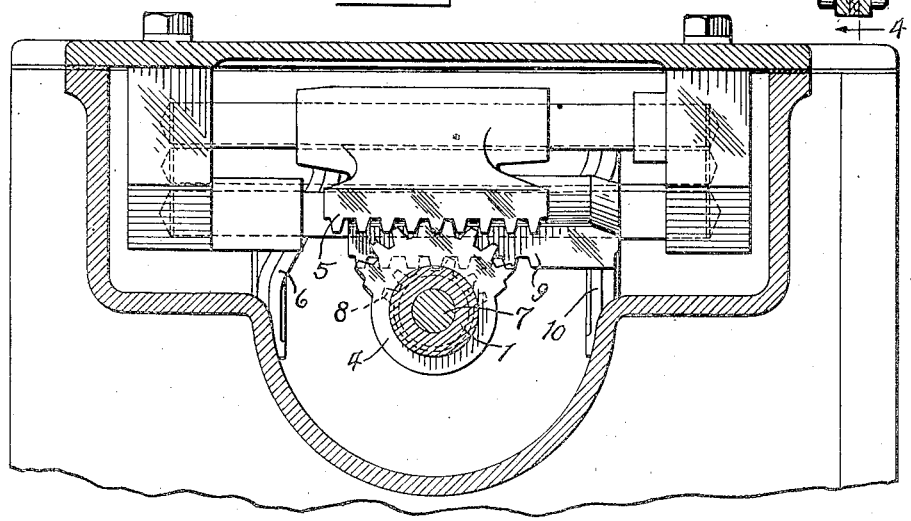

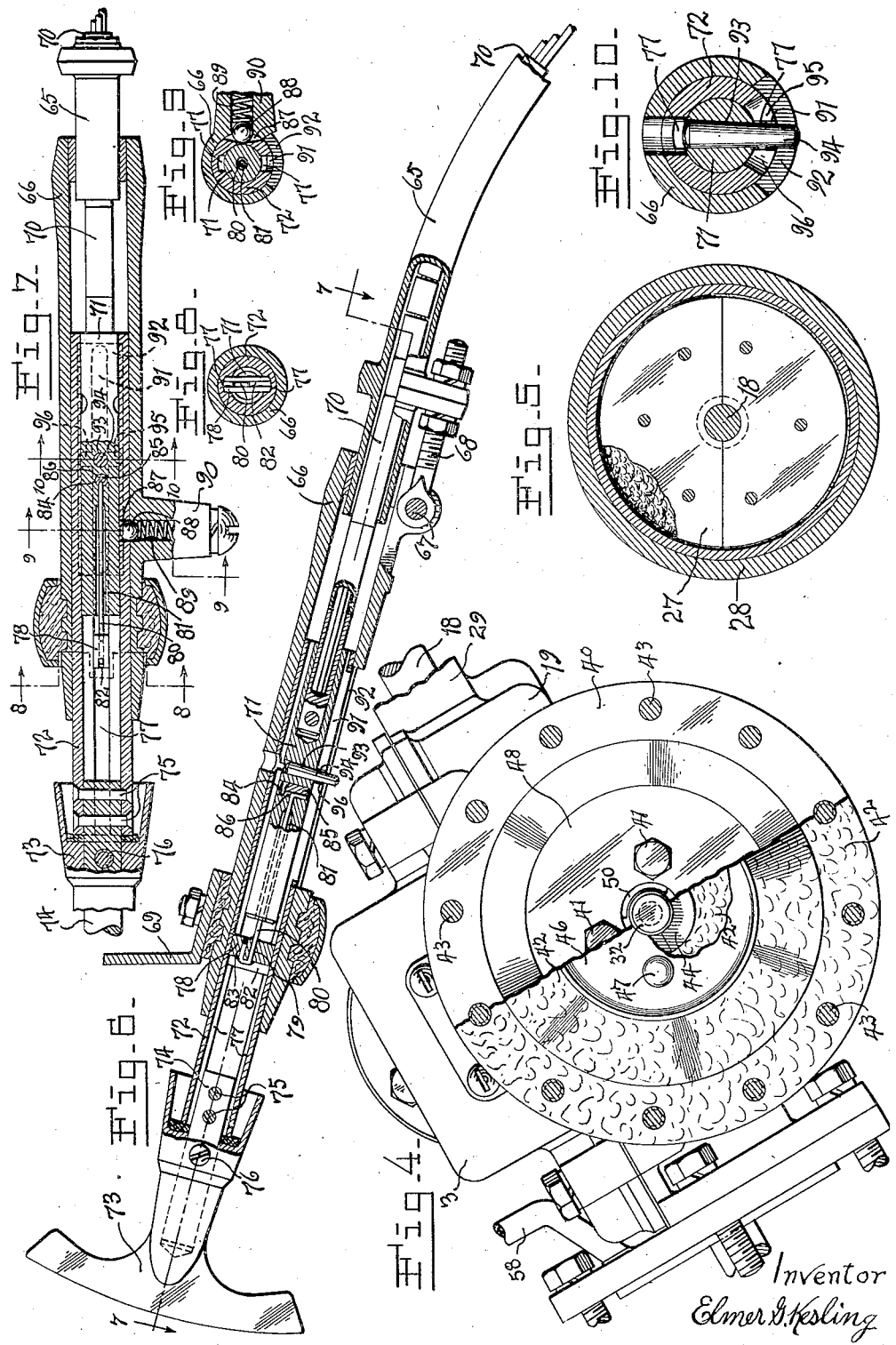

2,073,108

UNITED STATES PATENT OFFICE 2,073,108

GEAR SHIFTING MECHANISM

Elmer G. Kesling, Bloomfield, Mo.

Application May 22, 1935, Serial No. 22,797

19 Claims. (Cl. 74—335)

This invention relates to gear shifting mechanism, and has special utility as a part of the transmission gearing of automobiles and other vehicles. The gear shifting mechanism used is of the type in which fluid energy is utilized to effect both the selecting and the shifting movements.

In the showing of the drawings, vacuum energy is to be used; but it is understood that only minor changes would be required for the utilization of fluid energy under pressure.

The invention does not include any valve controlling means for the power device, as any known valve controlling means may be used; but the invention has to do with the association of the power device with the gear shifting mechanism; and also includes an emergency manual control for the shifting mechanism to be used to select and shift the gears in case the power device fails to do so, or in case no fluid energy is being supplied.

Heretofore, power shifting mechanisms have been constructed with provision for inserting an emergency lever in a manner to effect the selecting and shifting in case the power device should fail to do so. This emergency lever was carried as an extra part, probably in the tool box, and there was always a possibility of getting it misplaced or lost.

An object of the invention is to provide an emergency control that is always in place and ready for the operator's use in case it is needed.

Another object of the invention is to provide an emergency control of such construction that it is not moved from the neutral position by the shifting operations of the power device.

Another object of the invention is to provide a construction wherein the emergency control will be in easy reach of the operator and out of the way of all occupants of the automobile.

A further object is to provide a construction in which all parts are enclosed and either operate in oil or easily supplied with the required operating oil.

Various other objects and advantages of the invention will be made apparent from the following description, reference being made to the annexed drawings, in which:

Fig. 1 is a vertical sectional view approximately on the line 1—1 of Fig. 2 showing the connections of the operating mechanism with the devices directly operated thereby.

Fig. 2 is a sectional view approximately on the line 2—2 of Fig. 1.

Fig. 3 is a vertical sectional view approximately on the line 3—3 of Fig. 2.

Fig. 4 is a sectional view approximately on the line 4—4 of Fig. 2.

Fig. 5 is a sectional view approximately on the line 5—5 of Fig. 1.

Fig. 6 is a vertical sectional view of the upper end of the emergency control and its supporting means.

Fig. 7 is a sectional view approximately on the line 7—7 of Fig. 6.

Fig. 8 is a sectional view approximately on the line 8—8 of Fig. 7.

Fig. 9 is a sectional view approximately on the line 9—9 of Fig. 7.

Fig. 10 is an enlarged sectional view approximately on the line 10—10 of Fig. 7.

An elongated hub 1 is mounted for rotation in a bearing 2 in a casing 3 and has an integral gear 4 which meshes with a rack 5 integral with a low and reverse shifting yoke 6.

A shaft 7 is mounted for rotation in the hub 1 and has an integral gear 8 which meshes with a rack 9 integral with a high and intermediate shifting yoke 10.

A segmented gear 11 is secured upon the hub 1 near the end of the hub and a segmented gear 12 is secured on the adjacent projecting end of the shaft 7.

The adjacent hubs of the gears 11 and 12 have cutaway portions forming surfaces 13 and 14 and have end walls 15 and 16, respectively. The surfaces 13 and 14 are curved on an equal radius from a common axis, and are relieved as at 17 for purposes hereafter noted.

A shaft 18 is mounted for rocking and longitudinal movements in a casing 19 which is secured to the casing 2.

Secured to the shaft 18 is an actuator 20 which is moved with the shaft 18. The actuator 20 has rack teeth 21 and 22 which selectively mesh with the gears 11 and 12, respectively. The actuator 20 also has a projecting rib 23, which has a curved surface 24 and flat side walls 25 and 26.

The shaft 18 projects beyond the casing 19 and is rotatively secured in a piston 27 as shown or in any known manner. The piston 27 moves with the longitudinal movements of the shaft 18 in a vacuum cylinder 28 secured to the adjacent end of the casing 19. The other end of the casing 19 has a tubular projection 29 forming the bearing for that end of the shaft 18.

It is here noted that in reality the shaft 18 and the actuator 20 may together be termed the actuator 18—20; because they are positively attached and always move together. It is also to be noted that the shaft 18 becomes the piston rod for the power shifting device, and one end element of the emergency control.

The actuator 20 also has gear teeth 30 cut longitudinally thereupon in such a manner as to form a special gear for meshing with gear teeth 31 cut upon a shaft 32 which is mounted for longitudinal movements in the casing 19. One end of the shaft 32 is mounted in a bearing 33 in a wall of the casing 19, and the other end is mounted in an adjustable bearing means 34 screwed into the opposite wall of the casing 19, and secured with a nut 35 and cotter pin 36. The end of the shaft 32 having bearing in the bearing member 34 is reduced in size forming a shoulder 37 for butting against the end 38 of the member 34.

A slit 39 is provided in the member 34 for the purpose of relieving trapped grease that might get into the bearing member 34.

The other end of the shaft 32 projects beyond the casing 19 into a vacuum diaphragm casing 40 which is secured to the adjacent side of the casing 19 by bolts 41.

A flexible diaphragm 42 is circumferentially secured in the casing 40 with bolts 43, and in a groove 44 in the projecting end of the shaft 32 by use of a two part metal disk 45, side disks 46 and rivets 47. The diaphragm 42 separates the casing 40 into chambers 48 and 49.

A spring 50 normally holds the diaphragm 42 and shaft 32 in the longitudinal position shown in the drawings. In the showing of the drawings, a spring 50 is mounted on the shaft 32 within the chamber 48. One end of the spring 50 abuts against the adjacent disk 46 and the other end against the adjacent wall of the diaphragm case 40. The action of the spring 50 is to constantly urge the diaphragm 42 and the shaft 32 attached thereto in a direction to expand the chamber 48 and at the same time turning the actuator 20 to a certain position through the teeth 31 meshing with the teeth 30.

An adjusting member 51 is screwed into the wall of the casing 40 as an abutment for the adjacent end of the shaft 32, and is secured by a nut 52 and cotter pin 53.

The member 34 and the member 51 are adjustable to regulate the longitudinal travel of the shaft 32.

A vacuum connecting tube 54 is secured in the wall of the chamber 48, and a hole 55 is provided through the wall of the chamber 49.

The piston 27 forms the cylinder 28 into separate chambers 56 and 57. Vacuum connecting tubes 58 and 59 are secured in the walls of the chambers 56 and 57, respectively.

The end of the shaft 18 supported in the projection 29 has a reverse and intermediate speed groove 60, a neutral groove 61 and a low and high speed groove 62, respectively, cut circumferentially in spaced relation.

A hole 63 is provided in the adjacent wall of the casing 19 for the reception of a spring pressed ball 64 for engagement with either of the grooves 60, 61, or 62. The grooves 60, 61 and 62 are so placed that, when the ball 64 is in the groove 61, the actuator 18—20 will be longitudinally located for selective positioning; and, when the ball 64 is in the grooves 60 or 62, the actuator 18—20 will have been completely moved to a shifted position.

One end of a curved guide tube 65 is secured in the end of the projection 29 and the other end is adjustably secured in one end of the member 66 by bolts 67 and 68. The member 66 is secured to the instrument panel 69.

A flexible shaft 70 is mounted for rocking and longitudinal movements in the curved guide tube 65, and has one end secured to the adjacent end of the shaft 18 and the other end to one end of a shaft 71 which is mounted for certain rocking and longitudinal movements in the tubular shaft 72.

The tubular shaft 72 is mounted for rocking and longitudinal movements in the member 66. The tubular shaft 72 projects beyond the end of the member 66, and an operating handle 73 is secured to said projecting end by the use of a stub shaft 74 with rivets 75 and a screw 76.

The tubular shaft 72 has opposite longitudinal grooves 77 provided in its inner wall.

A block 78 is mounted between the respective ends of the shafts 71 and 74 for sliding movements in the grooves 77. A hole 79 is provided in the block 78 in line with the longitudinal axis of the shaft 71. One end of a length of spring wire 80 is secured by soldering or otherwise in the hole 79, and the other end extends into an axial hole 81 in the adjacent end of the shaft 71 and is secured by soldering or otherwise in the hole 81.

In the showing of the drawings, the block 78 has a groove 82 in one edge across the hole 79, and a second hole 83 provided in the block 78 connects with the groove 82 and is near to and parallel with the hole 79. One end of the wire 80 is bent in such a manner that the bent end is received by the hole 83 and groove 82 when the wire has been placed in the hole 79. The wire 80 thus placed may be securely attached to the block 78 with solder.

In the showing of the drawing, the hole 81 has an outer enlarged portion and an inner smaller portion which connects with a hole 84 drilled through the shaft 71; and a pin 85 having a longitudinal groove 86 in one side fits snugly in the hole 84. The other end of the wire 80 has been inserted into the hole 81 and projected into the hole 84 and the pin 85 has then been driven into the hole 84 in such a manner to bend the end of the wire 80 so the bent end will repose in the groove 86 as shown in the drawing. The wire 80 thus placed may be securely attached to the shaft 71 with solder.

A notch 87 is provided in the wall of the tubular shaft 72.

A spring pressed ball 88 is mounted in a hole 89 in a projection 90 on the member 66 for engagement with the notch 87.

A longitudinal slit 91 is provided in one side of the tubular shaft 72 parallel with the groove 77.

A slot 92 is provided through the wall of the member 66.

A tapered hole 93 is provided through the shaft 71 into which is inserted a tapered pin 94 which also projects through the slit 91 and the slot 92.

The parts are so constructed and arranged that the block 78 in cooperation with the grooves 77 and the action of the spring wire 80 will normally hold the shaft 71 in such rotative relation that the projecting end of the pin 94 will repose for free movement along the slit 91. The slit 91 and the slot 92 are both long enough to allow the shaft 71 to have the same longitudinal movements as the shaft 18.

Recesses 95 and 96 for engagement with the pin 94 are provided in the wall of the tubular shaft 72 in communication with opposite sides, respectively, of the slit 91. The parts are so constructed and positioned that, when the ball 64 is in the groove 61 and the ball 8 is in the notch 87, the recesses 95 and 96 will be in line for engagement with the pin 94. The recesses 95 or 96 are made to engage the pin 94 by the respective rotation of the tubular shaft 72 and the block 78 against the action of the spring 80.

The parts 70, 71, 72, 73 etc. form the emergency control by which the operator may select and shift the gears in case the power device fails to do so, or when no fluid energy is being supplied.

The parts 72 and 73 form the manual operating means for the emergency control.

The rotative movements of the actuator 20, shaft 18, shaft 70 etc. are selective movements, and longitudinal movements of these parts are shifting movements.

It is obvious that the rotative movements of the actuator 20 and shaft 18 are limited by the engagement of the racks 11 and 12 with the gears 21 and 22, respectively, or by the engagement of the surfaces 15 and 16 with the surfaces 25 and 26, respectively.

On account of the elasticity of the flexible shaft 70 under rotative forces, a certain amount of twist is given to it when sufficient manual force has been applied to the emergency operating handle 73 to insure complete selective movement of the actuator 20; and, since the rotation of the parts operated by the flexible shaft 70 is limited, the slot 92 in the member 66 is provided for engagement of the pin 94 for the purpose of limiting the rotation of the operating end of the flexible shaft 70 in order to prevent undue twisting of the said shaft 70 by the operator during emergency selective movements. Otherwise, the operator might unthinkingly twist the flexible shaft 70 to the point of injury.

The notch 87 may be made any required depth and length to afford sufficient engagement with the ball 88, however, in the showing of the drawing, the notch 87 varies in depth being deeper in the central portion and gradually shallower toward the ends. The depth and length are such that the ball 88 cannot be disengaged from it until the shaft 72 has been turned a sufficient distance to engage the pin 94 against a side wall of the slot 92.

The recesses 95 and 96 need, of course, to be in position opposite the pin 94 in order that the pin may be engaged by either of them. If it so happens that the recesses 95 and 96 are out of this position and the notch 87 is in engagement with the ball 88, the shaft 72 will first need to be rotated a distance sufficient to disengage the notch 87 from the ball 88 and then moved longitudinally until the recesses are in position to engage the pin after which the shaft 72 may be rotated an additional distance against the action of the spring wire 80 to engage a recess 95 or 96 with the pin 94. Of course, it is obvious that the resilient action of the wire 80 will return the shaft 72 to normal rotative relation relative to the shaft 71 as soon as this manual force is released.

Selective movements are effected only when the ball 64 is in the groove 61.

In selection by power, resilient means is used to effect selection for shifting into intermediate and high speeds; and fluid energy is used acting against the action of the resilient means to effect selection for shifting into reverse and low speeds.

In the operation of the device, the following conditions will be noted: That the shaft 18 and the actuator 20 cannot be rocked except when in such longitudinal position that the surfaces 13 and 14 coincide, which condition allows the surface 24 to be moved over both or either of the surfaces 13 and/or 14; that the cutaway portions 17 makes it possible to start the rocking of the actuator 20 from one extreme or the other without first precisely or definitely locating the surfaces 13 and 14; that the said parts 18—20 cannot be moved longitudinally except when entirely rocked one way or the other so that the surface 24 is entirely free of one or the other of the surfaces 13 or 14, and the teeth 21 or 22 are entirely in mesh with the teeth of the gears 11 or 12, respectively; that as soon as the said parts 18—20 are substantially moved longitudinally in either direction, rotation of the said parts 18—20 will be prevented by the engagement of the surface 15 with the surface 25 or the engagement of the surface 16 with the surface 26, as the case may be; that when the surface 16 is not engaged with the surface 26, the action of the spring 50 automatically keeps 18—20 turned so the teeth of the gear 12 are entirely engaged by the rack teeth 22; that the gear 11 or 12 not in mesh with the rack teeth 21 or 22, respectively, will be held against turning by the surface 24 engaging the surface 13 or 14 as the case may be; that a selected position is the full rotation allowed the actuator 20 in either direction; that the shaft 70, shaft 71, pin 94, spring 80 and block 78 being attached together and the shaft 70 secured to the shaft 18, the said parts 70, 71, 94, 80 and 78 will be both rotated and moved longitudinally with the shaft 18; that rotation of said parts 18, 70, 71, 94, 80 and 78 will also rotate the shaft 72 and the handle 73 positively by the pin 94 engaging the slit 91, or resiliently through the spring 80 and by the block 78 engaging the slots 77 when the pin 94 is opposite the recesses 95 and 96; that longitudinal movement of said parts 18, 70, 71, 94, 80 and 78 will not normally move 72—73 longitudinally, because of the free movement of the pin 94 in the slit 91; that 72—73 is normally held against longitudinal movements by the notch 87 engaging the ball 88; that power selective movement never rotates 72—73 sufficiently to disengage the notch 87 from the ball 88; that 72—73 may be manually rotated to disengage the notch 87 from the ball 88 and moved longitudinally when so disengaged; that the manual rotation of 72—73 to disengage 87—88 may be against the resilient action of the flexible shaft 70; that when 87—88 has been disengaged and 72—73 moved longitudinally, longitudinal movements of said parts 18, 70, 71, 94, 80 and 78 in the opposite direction will move 72—73 to the position for engagement of the notch 87 with the ball 88, because the pin 94 will engage an end of the slit 91; that the notch 87 is of such length circumferentially that disengagement from the ball 88 will be effected when the pin 94 has been moved to substantial contact with a side wall of the slot 92; that 72—73 may be manually rotated to engage the recess 95 or 96 with the pin 94 when in proper longitudinal relation for such engagement; that when either of the recesses 95 or 96 is in engagement with the pin 94, manual longitudinal movements of 72—73 will also move 71, 70, 18, etc. longitudinally in the same direction; that the manual force rotating 72—73 to engage either of the recesses 95 or 96 is against the action of the spring 80; that as soon as the manual rotating force is relieved, 72—73 will be returned to normal rotative relation relative to 71 by the action of the spring 80 through the block 78 engaging the slots 77; and various other conditions will be noted throughout the specification.

Therefore, in making a shift into low or reverse speed by power means, starting from the position shown in Figs. 2 and 3, vacuum is created in chamber 48 through tube 54 from a source of vacuum energy, not shown, whereupon atmospheric air will rush through the hole 55 into chamber 49 and push the diaphragm 42 and shaft 32 against the action of the spring 50 in the longitudinal direction to cause the teeth 31—30 to turn the actuator 20 to the fully selected position where the rack 21 will be entirely in mesh with the gear 11 and the surface 24 will be entirely free from the surface 13; and then vacuum is created in chamber 56 or 57 through tube 58 or 59, respectively, from a vacuum source, not shown, whereupon atmospheric air will rush into chamber 57 or 56 through tube 59 or 58, respectively, and push the piston 27, rod 18 and actuator 20 longitudinally to shift the selected gear as desired through the parts 11, 1, 4, 5 and 6. Then, to shift into intermediate or high speed by power means, the parts are brought to neutral position by creating vacuum in the correct chamber 56 or 57 and the action on the piston and other parts are simply reversed from that of shifting movements. As soon as selection position of the actuator 20 etc. is reached and the surface 25 or 26 has been freed from the surface 15 or 16, respectively, as the case may be, the spring 50 will automatically move the shaft 32 etc. longitudinally in the direction to cause the teeth 31—30 to turn the actuator 20 to the fully selected position where the rack 22 will be entirely in mesh with the gear 12 and the surface 24 will be entirely free from the surface 14; and then vacuum is created in chamber 56 or 57 through tube 58 or 59, respectively, from a vacuum source, not shown, whereupon atmospheric air will rush into chamber 57 or 56 through tube 59 or 58, respectively, and push the piston 27, rod 18 and actuator 20 longitudinally to shift the selected gear as desired through the parts 12, 7, 8, 9 and 10.

As noted heretofore, the entire emergency control turned with the actuator 20 during the above selective movements; and, as also noted heretofore, the parts 18, 70, 71, 94, 80 and 78 moved longitudinally with the actuator 20 while the parts 72—73 were not moved with the actuator 20 during the above shifting movements.

Manual turning force applied to the handle 73 will always be against the pin 94 from a side of the slit 91, except at the time the pin 94 is opposite the recesses 95 and 96 when such force will be against the torsional action of the spring wire 80. It will be understood, however, that should the handle 73 be turned until the end of the recess engaged encounters the pin 94, said pin will receive all of the manual force applied in excess of the torsional strength of the spring wire 80. It is obvious that the twist of the wire 80 will never be more than the depth of the recesses 95 or 96, as the case may be.

In the manual operation of the emergency control, the manual operating means 73—72 is turned, preferably in the direction of the selection desired, to effect disengagement of the notch 87 from the ball 88, if so engaged, and then rotated an additional distance to engage a recess 95 or 96, as the case may be, with the pin 94, if in position for such engagement, whereupon, if these movements have been in the direction of selection for shifting into intermediate or high speed, the spring 50 has already effected the fully selected position of the actuator 20 where the rack teeth 22 are entirely in mesh with the gear 12 and the surface 24 is entirely free from the surface 14, and manual force may be applied to move the emergency control together with the actuator 18—20 longitudinally to shift the selected gear as desired through the parts 12, 7, 8, 9 and 10;. but, if the above turning movements of the manual operating means 73—72 had been in the direction of selection for shifting into low or reverse speed, the manual force would have turned the actuator 20 against the action of the spring 50 to the fully selected position where the rack teeth 21 would have been entirely in mesh with the gear 11 and the surface 24 would have been entirely free from the surface 13, and manual force may have been applied to move the emergency control together with the actuator 18—20 longitudinally to have shifted the selected gear as desired through the parts 11, 1, 4, 5 and 6.

It is understood, however, that if, in manual selecting, the pin 94 is not in position for engagement with the recess 95 or 96, the manual operating means 73—72 after having been disengaged from the ball 88 is moved longitudinally until the recesses 95 and 96 are in position for engagement with the pin 94, and then the manual operating means 73—72 is turned to engage the desired recess 95 or 96 with the pin 94; whereupon manual force may be applied to move the entire emergency control together with the actuator 18—20 longitudinally as desired to shift the selected gear as aforesaid, or to effect selection position whereat manual force may be applied to effect the selection desired as aforesaid, and then the selected shift manually completed as aforesaid.

It is obvious that an emergency control of the type shown and described in this application is applicable to any power shifting mechanism having a single actuator that is mounted for rotative selective movements and longitudinal shifting movements.

I do not restrict myself in any unessential respects but what I claim and desire to secure by Letters Patent is:

1. In a gear shifting mechanism normally controlled by power means, an emergency control for said gear shifting mechanism operatively connected with said mechanism, a support, a manual operating means for said emergency control mounted on said support, and a pin and slit means for connecting said operating means in operative relation with said emergency control to manually operate said emergency control and thereby said gear shifting mechanism.

2. In a selective gear shifting mechanism normally controlled by power means, an emergency control for said gear shifting mechanism operatively connected to said mechanism, a manual operating means for said emergency control, means normally connecting said operating means with said emergency control for manually effecting gear selective movements, and means manually engageable for connecting said operating means with said emergency control for manually effecting gear shifting movements.

3. In a gear shifting mechanism normally controlled by power means, an emergency control for said gear shifting mechanism comprising a manual operating means, a flexible shaft operatively connected with said gear shifting mechanism, and a pin and slit means for connecting said operating means in operative relation with said flexible shaft for manually operating said flexible shaft and thereby said gear shifting mechanism.

4. In a selective gear shifting mechanism normally controlled by power means, an emergency control for said gear shifting mechanism comprising a manual operating means, a flexible shaft operatively connected with said gear shifting mechanism, means normally connecting said operating means with said flexible shaft for manually effecting gear selective movements, and means manually engageable for connecting said operating means with said flexible shaft for manually effecting gear shifting movements.

5. In a gear shifting mechanism normally controlled by power means, an emergency control for said gear shifting mechanism comprising a tubular operating device mounted for rocking and longitudinal movements, an operated device mounted in said tubular device for rocking and longitudinal movements, and resilient means associated with said devices for urging normal rotative relation between said devices.

6. In a gear shifting mechanism normally controlled by power means, an emergency control for said gear shifting mechanism comprising a tubular operating device mounted for rocking and longitudinal movements, an operated device mounted in said tubular device for rocking and longitudinal movements, and means associated with said devices cooperating to lock said devices in normal rotating relation for simultaneous rotation, and at the same time allowing certain free relative longitudinal movements of said devices.

7. In a gear shifting mechanism normally controlled by power means, an emergency control for said gear shifting mechanism comprising a tubular operating device mounted for rocking and longitudinal movements, an operated device mounted in said tubular device for rocking and longitudinal movements, resilient means associated with said devices urging normal rotative relation between said devices, a slit formed in one of said devices, engaging means mounted on the other one of said devices and cooperating with said slit to lock said devices in normal rotative relation for simultaneous rotation and at the same time allowing certain free relative longitudinal movements of said devices, and additional means associated with said slit and cooperating with said engaging means by rocking said devices differentially against the action of said resilient means to engage said devices for simultaneous longitudinal movements.

8. In a gear shifting mechanism normally controlled by power means, an emergency control for said gear shifting mechanism comprising a tubular shaft mounted for rocking and longitudinal movements, a spindle mounted in said tubular shaft for rocking and longitudinal movements, grooves formed in the inner wall of said tubular shaft, means mounted for sliding movements in said grooves, and resilient means connected to said means and to said spindle, said resilient means urging normal rotative relation between said shaft and said spindle.

9. In a gear shifting mechanism normally controlled by power means, an emergency control for said gear shifting mechanism comprising a tubular shaft mounted for rocking and longitudinal movements, a spindle mounted in said tubular shaft for rocking and longitudinal movements, and a pin and slot connection associated with said shaft and said spindle cooperating to lock said shaft and said spindle in normal rotative relation for simultaneous rotation, and to allow certain free relative longitudinal movements of said shaft and said spindle.

10. In a gear shifting mechanism normally controlled by power means, an emergency control for said gear shifting mechanism comprising a tubular operating device mounted for rocking and longitudinal movements, an operated device mounted in said tubular device for rocking and longitudinal movements, a longitudinal slit in the wall of said tubular device, means connected to said operated device and projecting through said slit to lock said devices in normal rotative relation for simultaneous rotation, said projection being movable along said slit allowing free relative longitudinal movements of said devices, and recesses in the wall of said tubular device communicating with said slit for engagement of said projection upon differential rotation of said devices for simultaneous longitudinal movements of said devices.

11. Mechanism of the character described comprising selective gear shifter elements, an actuator engageable to shift said elements, power means connected to said actuator for normally selectively engaging said actuator, a second power means connected to said actuator for moving said actuator to shift the selected element, a manual emergency operating means supported at a remote point, a flexible shaft having one end connected to said actuator, and a pin and slit means associated with the other end of said flexible shaft and said operating means operatively to engage said operating means with said flexible shaft and thereby said actuator for manually effecting selective shifting of said shifter elements in case said power means fails to shift the same.

12. A gear shifting mechanism normally operated by power means, an emergency operating means for said gear shifting mechanism comprising a tubular shaft mounted for rocking and longitudinal movements, a spindle mounted in said tubular shaft, a pin and slit connection preventing relative rotation between said shaft and said spindle, and a recess in the side of said slit for engagement of said pin, thereby connecting said shaft and said spindle for operative longitudinal movements.

13. Mechanism of the character described comprising selective shifter elements, an actuator for shifting said elements selectively, power means operatively connected with said actuator for normally effecting selecting and shifting of said elements, an emergency control, a manual operating means, and a pin and slit means for engaging said manual operating means with said emergency control at will for manually operating said actuator in emergency.

14. Gear shifting mechanism of the character described comprising a case, a shifter actuator supported in said case, power means connected to said actuator for normally operating said actuator, a bearing member supported at a distance from said case, a curved tube connecting said case and said member, a tubular shaft mounted for movement in said member, a spindle mounted for movement in said tubular shaft, means associated with said tubular shaft and said spindle for operative engagement therebetween, a flexible shaft mounted in said curved tube operatively connecting said actuator with said spindle, and manual means attached to said tubular shaft, whereby said actuator may be operated in case said power means fails to operate the same.

15. Gear shifting mechanism comprising selective shifter elements, an actuator, power means connected with said actuator for normally selecting and shifting said elements, a flexible shaft operatively connected to said actuator, a manual means, and a pin and slit means for engaging said manual means with said shaft at will, whereby said actuator may be operated by manual force in case said power means fails to operate said actuator.

16. An emergency control for gear shifting mechanism comprising a manual operating portion, an operated portion, means for free normal loss motion connection between said operating portion and said operated portion, and engaging means associated with said operating portion and said operated portion for positive operative engagement therebetween.

17. Mechanism of the character described comprising a selective shifter actuator, a gear segment formed on said actuator, a rack mounted for longitudinal movements and meshing with said gear segment, a power device connected to said rack for moving said rack to selectively position said actuator, and a second power device connected to said actuator for moving said actuator after being selectively positioned.

18. Mechanism of the character described comprising a selective shifter actuator, a power device connected to said actuator for positioning said actuator selectively, a second power device connected to said actuator for imparting shifting movements to the selected actuator, an emergency control connected to said actuator and moved by said actuator during both selecting and shifting movements by said power devices respectively, an operating means for said emergency control, and a pin and slit connection for connecting said control and said operating means, whereby said operating means is moved by said control during said power selecting movements, and unmoved by said control during said power shifting movements.

19. Mechanism of the character described comprising a selective shifter actuator, a power device connected to said actuator for positioning said actuator selectively, a second power device connected to said actuator for imparting shifting movements to the selected actuator, an emergency control connected to said actuator and moved by said actuator during both selecting and shifting movements by said power devices respectively, a support, an operating means for said emergency control mounted for movement in said support, a pin and slit connection for connecting said control and said operating means for effecting movement of said operating means by said control during said power selecting movements only, and means associated with said operating means and said support normally holding said operating means from movement during said power shifting movements.

ELMER G. KESLING.